United States Patent
Yang

(10) Patent No.: US 7,353,343 B2
(45) Date of Patent: Apr. 1, 2008

(54) MEMORY MANAGEMENT SYSTEM FOR PREVENTING PROGRAM EXECUTION WHEN CPU FETCHES EXECUTION CODE FROM UNOCCUPIED REGION OF MEMORY

(75) Inventor: Chu-Ching Yang, Yongkang (TW)

(73) Assignee: Benq Corporation, Taoyuan (TW)

( * ) Notice: Subject to any disclaimer, the term of this patent is extended or adjusted under 35 U.S.C. 154(b) by 690 days.

(21) Appl. No.: 10/856,049

(22) Filed: May 28, 2004

(65) Prior Publication Data

US 2005/0005087 A1    Jan. 6, 2005

(30) Foreign Application Priority Data

Jul. 1, 2003    (TW) .............................. 92117921 A

(51) Int. Cl.
*G06F 12/16* (2006.01)

(52) U.S. Cl. ...................... 711/152; 711/154; 711/156; 712/227

(58) Field of Classification Search ................ 711/152, 711/154, 156; 712/227
See application file for complete search history.

(56) References Cited

U.S. PATENT DOCUMENTS 6,202,143 B1 * 3/2001 Rim ........................... 712/210
2004/0153768 A1 * 8/2004 Daemmrich et al. .......... 714/20

FOREIGN PATENT DOCUMENTS

EP    DE3606699    * 9/1987

* cited by examiner

*Primary Examiner*—Pierre Bataille
*Assistant Examiner*—Hetul Patel
(74) *Attorney, Agent, or Firm*—Thomas, Kayden, Horstemeyer & Risley

(57) ABSTRACT

A memory management system and method. The system includes a first storage device and a processing unit. The first storage device stores an exception code excluding operation codes (op-codes) corresponding to an instruction set. The processing unit reads the exception code from the first storage device and writes it to at least one unoccupied region of a memory in an electronic device, thereby enabling the electronic device to stop program execution when the CPU fetches the exception code from the unoccupied region of the memory.

13 Claims, 7 Drawing Sheets

MEMORY MANAGEMENT SYSTEM FOR PREVENTING PROGRAM EXECUTION WHEN CPU FETCHES EXECUTION CODE FROM UNOCCUPIED REGION OF MEMORY

BACKGROUND OF THE INVENTION

1. Field of the Invention

The present invention relates to electronic device management systems, and more particularly, to a method and system for memory management.

2. Description of the Related Art

FIG. 1 is a diagram of the architecture of a conventional computer system. A computer system includes a central processing unit (CPU), a memory 13, input devices 14, and output devices 15. All the subsystems of the computer communicate via CPU buses. The memory 13 stores instructions and data for initiating particular tasks, such as adding two numbers, and the data is manipulated by the stored instructions. A CPU is composed of an arithmetic logic unit (ALU) 11 and a control unit (CU) 12. Said units obtain instructions and data from memory, the instructions are then decoded to perform a sequence of programmed tasks. Input/Output devices are used to input and retrieve information from the computer.

The memory 13 is divided into two regions, program memory for storing instructions, and data memory for storing executable data. Two memory architectures have been introduced by Von Neumann and Harvard respectively. FIG. 2a is a diagram of the architecture of conventional Von Neumann computer system. In Von Neumann computer system, only one CPU bus is provided for communication between the CPU 211 and memory 212, resulting in excessive processing time. FIG. 2b is a diagram of the architecture of conventional Harvard computer system. The program memory 222 and data memory 223 of the Harvard system use separate CPU buses to communicate, alleviating the above limitation.

An instruction execution cycle includes two cycles, a fetch cycle when a CPU reads an instruction from program memory, and an execution cycle after the instruction is decoded by the CPU. The entire instruction execution cycle comprises the various steps of instruction fetching, decoding, data reading, instruction execution, and result storage.

An instruction set contains a number of instructions recognizable by a particular CPU. The instruction is a command encoded in 1's and 0's that initiates a CPU to complete a particular task, composed of a unique operation code (op-code) and operands if required. The instruction set contains three kinds of instruction, arithmetic logic instruction, data move instruction and control instruction. The arithmetic logic instructions carry out arithmetic and logic operations, such as add, subtract and bitwise "AND" operations. The data move instructions move data from a memory to a CPU and vice versa, from an input device to the CPU, from the CPU to an output device and from one CPU register to another. The control instructions alter the order in which a list of instructions is carried out, also called sequence control instructions.

An executable program is composed of multiple instructions, loaded into particular regions of program memory to perform a series of operations. In regular situations, the CPU fetches instructions to execute from these regions. Otherwise, the CPU fetches and executes instructions from unoccupied regions of program memory, or data memory, which may potentially cause stack overflow, data disturbance, or crash the computer.

In view of these limitations, a need exists for a system and method that prevent potential damage caused by fetching instructions from an unoccupied region of the memory to execute.

SUMMARY OF THE INVENTION

It is therefore an object of the present invention to provide a system and method that prevent potential damage caused by fetching instructions for execution from an incorrect memory region. To achieve the above object, the present invention provides a system and method of memory management that fills unoccupied regions of program memory, and data memory with an exception code excluding operation codes corresponding to a particular instruction set, thereby enabling an electronic device with an error control system to produce an exception for an undefined instruction, and a software interrupt when the CPU fetches the exception code for execution to prevent potential damage.

According to the invention, the system includes a first storage device and a processing unit. The first storage device stores the exception code. The processing unit reads the exception code from the first storage device, writes the exception code to unoccupied regions of program and data memory in the electronic device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
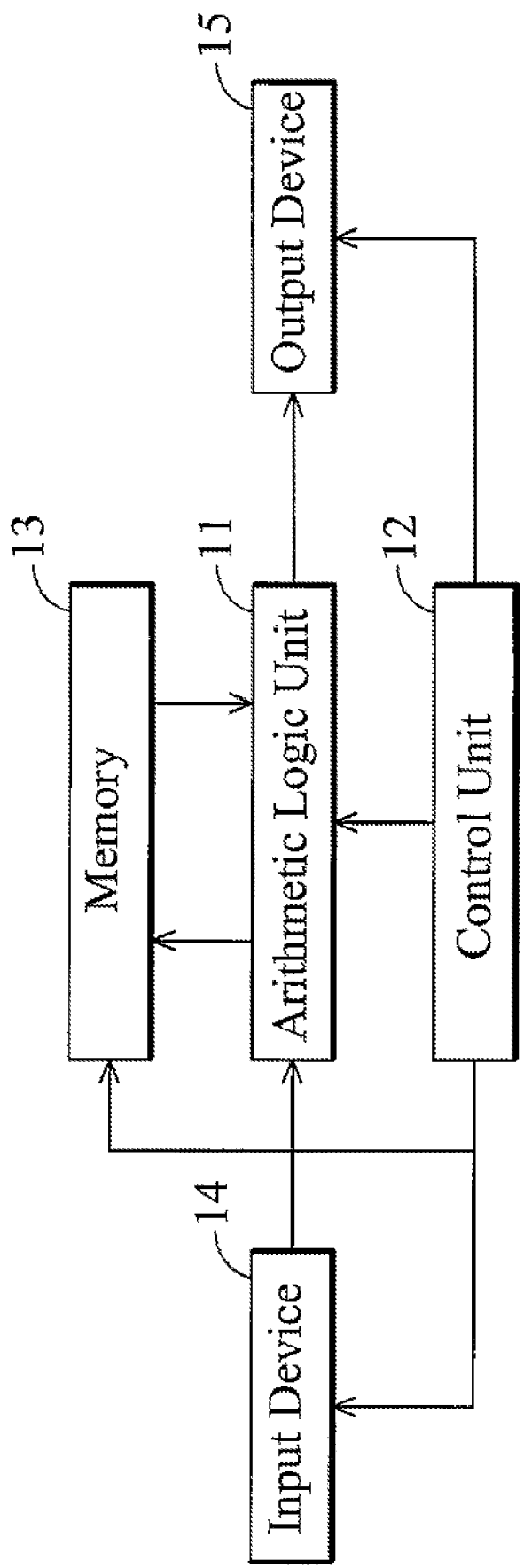
FIG. 1 is a diagram of the architecture of a conventional computer system.
Figure 2A:
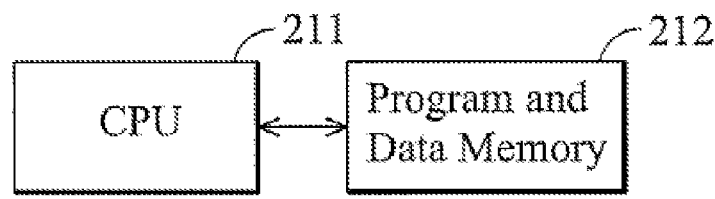
FIG. 2a is a diagram of the architecture of a conventional Von Neumann computer system.
Figure 2B:
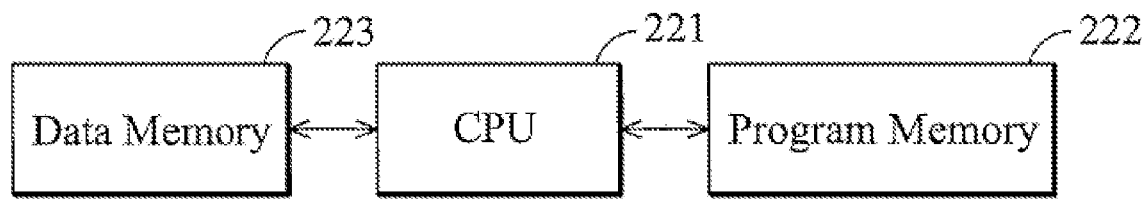
FIG. 2b is a diagram of the architecture of a conventional Harvard computer system.
Figure 3:
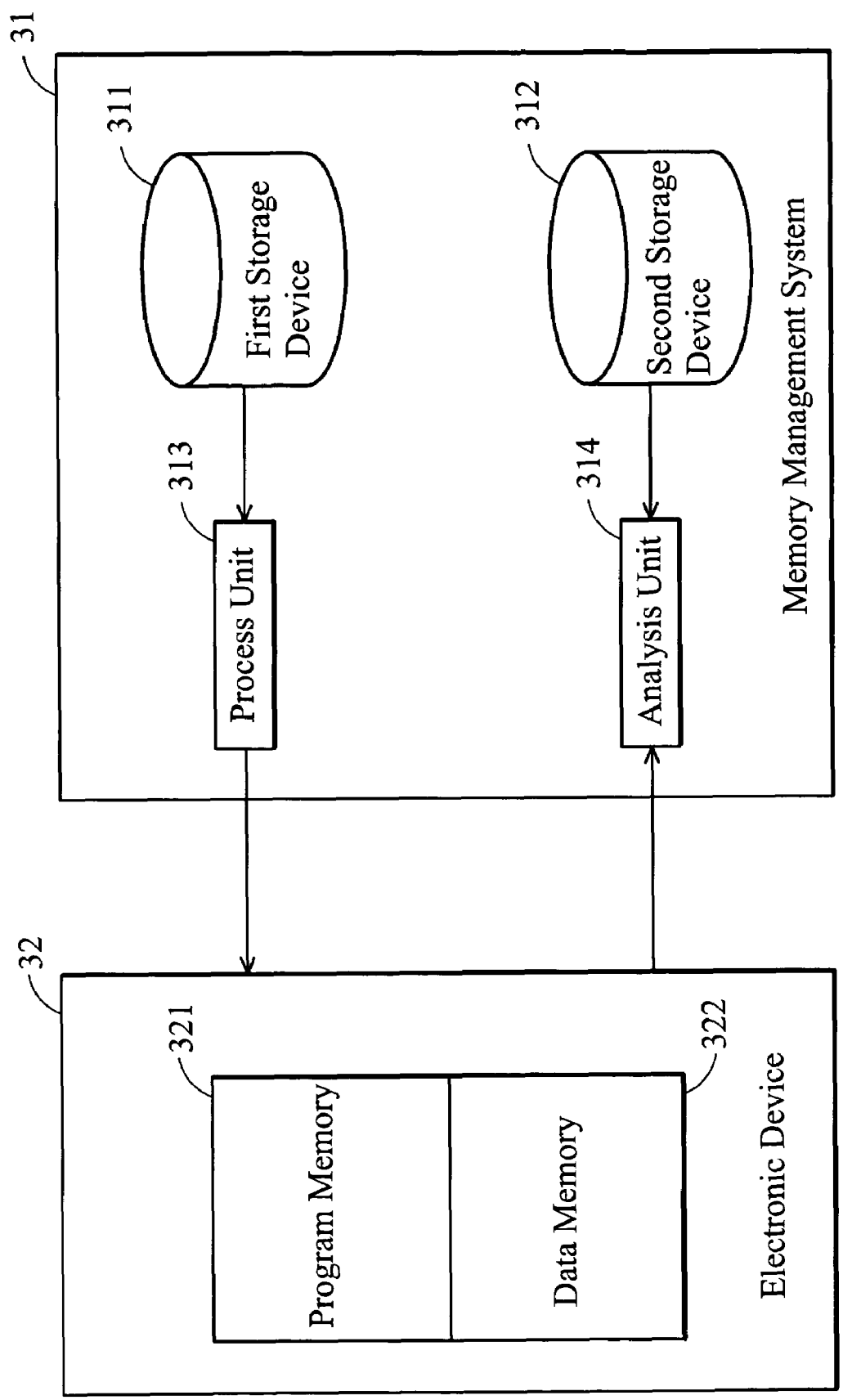
FIG. 3 is a diagram of the architecture of a system of memory management according to the invention.

FIG. 3 is a diagram of the architecture of a system of memory management according to the invention. The system 31 includes a first storage device 311, a second storage device 312, a processing unit 313, and an analysis unit 314.

The first storage device 311 storing the exception code can be a database, a file, or a ROM. The exception code excludes operation codes (op-codes) corresponding with an instruction set, for example, the exception code can be a number ranging from 0020 h to FFFFh since the instruction set contains 32 op-codes ranging from 0000 h to 001 Fh. Therefore, when the CPU fetches the exception code as an instruction to execute, an error control system in the electronic device stops execution and produces an exception of undefined instruction, and a software interrupt, effectively preventing potential damage such as stack overflow, data disturbance, or a system crash.

The second storage device 312 can be a file system, a relational database, an image database, or other system, to store a data image corresponding to a program memory 321 and a data memory 322 for initiating backup.

An electronic device 32 can be a PC, a mobile phone, a PDA or other device, having program memory 321 and data memory 322. The processing unit 313 reads the exception code from the first storage device 311, writes programs to particular regions of program memory 321, and, fills unoccupied regions of program memory 321, and data memory 322, with the exception code initiating the electronic device 32.

Two approaches, such as program-ahead and code-ahead, are used for initiation. These approaches are described in further detail in the following.

Figure 4B:
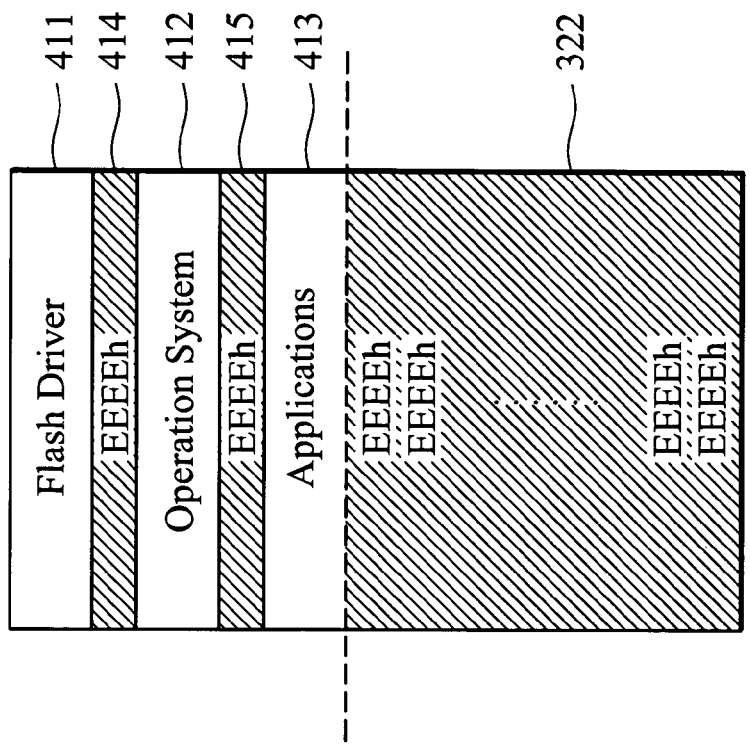
FIG. 4a, 4b, 5a, 5b are schematic diagrams of a memory according to the invention.
Figure 4A:
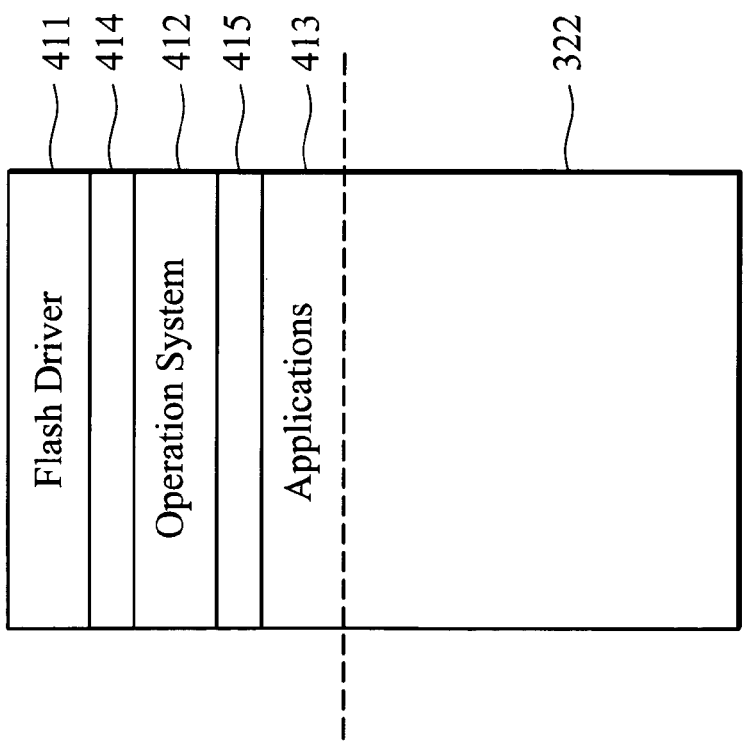

FIGS. 4a, 4b, 5a, and 5b are schematic diagrams of a memory in different aspects according to the invention. In the program-ahead approach, the processing unit 313 first writes programs to program memory 321 and reserves free space between each two programs, and subsequently fills unoccupied regions of program memory 321, and data memory 321 with exception codes. Referring to FIG. 4a, the processing unit 313 respectively writes a flash driver, an operating system and applications to regions 411, 412 and 413 of program memory 321, reserves free space, 414 and 415, between each two, and subsequently, referring to FIG. 4b, fills unoccupied regions 414, 415 of program memory 321, as well as data memory 322 with exception code "EEEEh".

In the code-ahead approach, the processing unit 313 first fills both program memory 321 and data memory 322 with the exception code, and subsequently replaces exception codes with programs in particular regions of program memory 321. Referring to FIG. 5a, the processing unit 313 first fills the program memory 321 and data memory 322 with exception code "EEEEh", and subsequently, referring to FIG. 5b, respectively replaces exception codes with the flash driver, operating system, and applications in the regions 411, 412 and 413 of program memory 321.

Figure 5B:
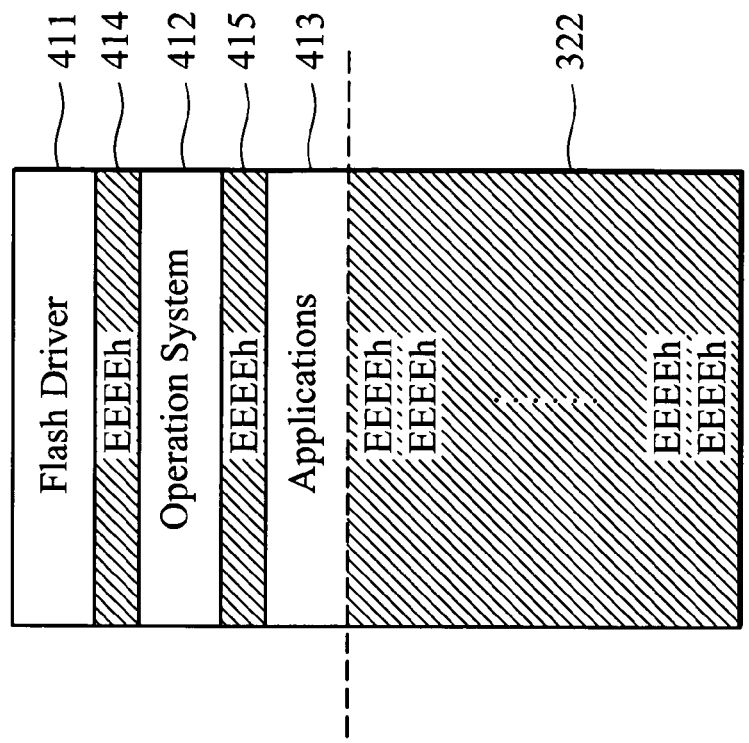
Figure 5A:
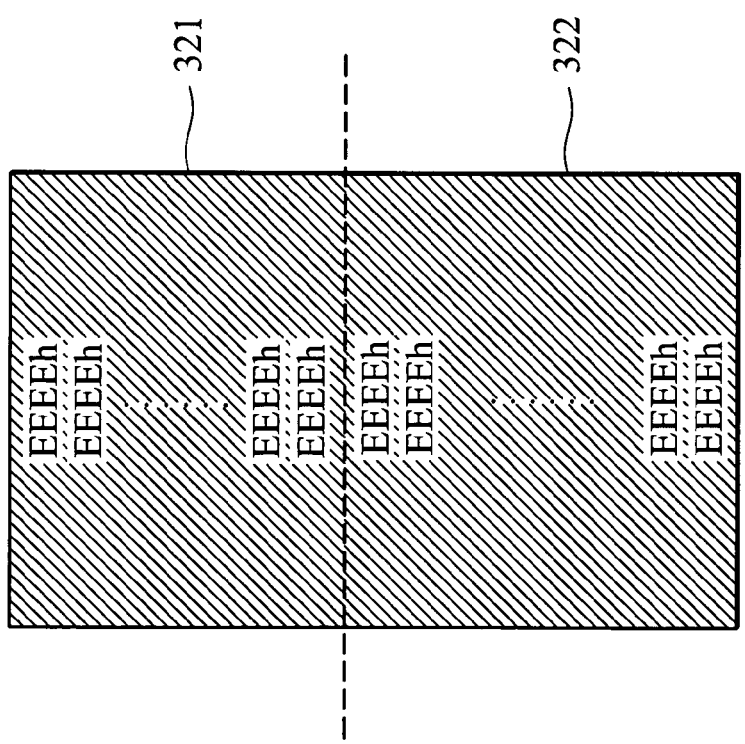

After initiating, the data image as shown in FIGS. 4b and 5b is stored in the second storage device 312.

When functioning normally, the CPU fetches instructions for execution from regions 411, 412, or 413 of program memory 311 only. When the CPU fetches an instruction from regions 414 or 415 of program memory 311, or data memory 312, an undefined instruction exception, and a software interrupt occur, stopping program execution.

The distribution of exception codes in the program memory 321 and the data memory 322 is re-programmed by applications 413 or the like, after the electronic device 32 is operational. The analysis unit 314 detects distribution variation of exception codes in an operating memory and compares the codes with the data image stored in the second storage device 312 for further troubleshooting.

Figure 6:
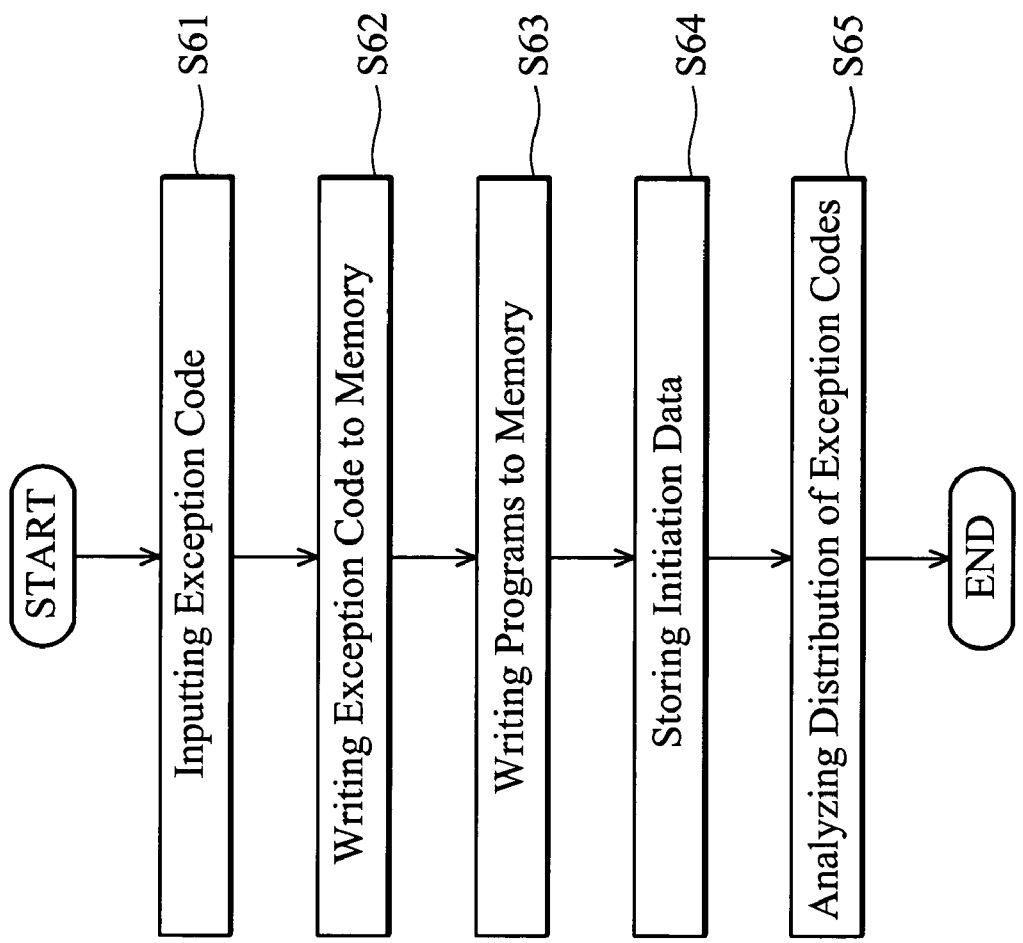
FIG. 6 is a flowchart showing a method of memory management according to the invention.

FIG. 6 is a flowchart showing a method of memory management according to the invention.

In step S61, the exception code excluding op-codes corresponding with the instruction set is read from the first storage device 311.

In step S62, the exception code is then written to the program memory 321 and data memory 322. As in step S63, programs, such as a flash driver, operating system, or applications, are written to particular regions of program memory 321, and free space is reserved between each two programs.

In step S64, the data image corresponding to the initiated programs memory 321 and data memory 322 is written into the second storage device 312.

Finally, in step S65, distribution variation of exception codes in an operating memory is detected by comparing the data image stored in the second storage device.

Although the order of the method has been described in a preferred embodiment, it is not intended to limit the method to the precise order disclosed herein. Those skilled in the art can perform variations without departing from the scope and spirit of this invention.

The system and method of memory management of the present invention writes the exception code to unoccupied regions of program and data memory of an electronic device, thereby enabling an error control system to produce an exception of undefined instruction, and a software interrupt when a CPU fetches exception code, thereby preventing potential damage.

Figure 7:
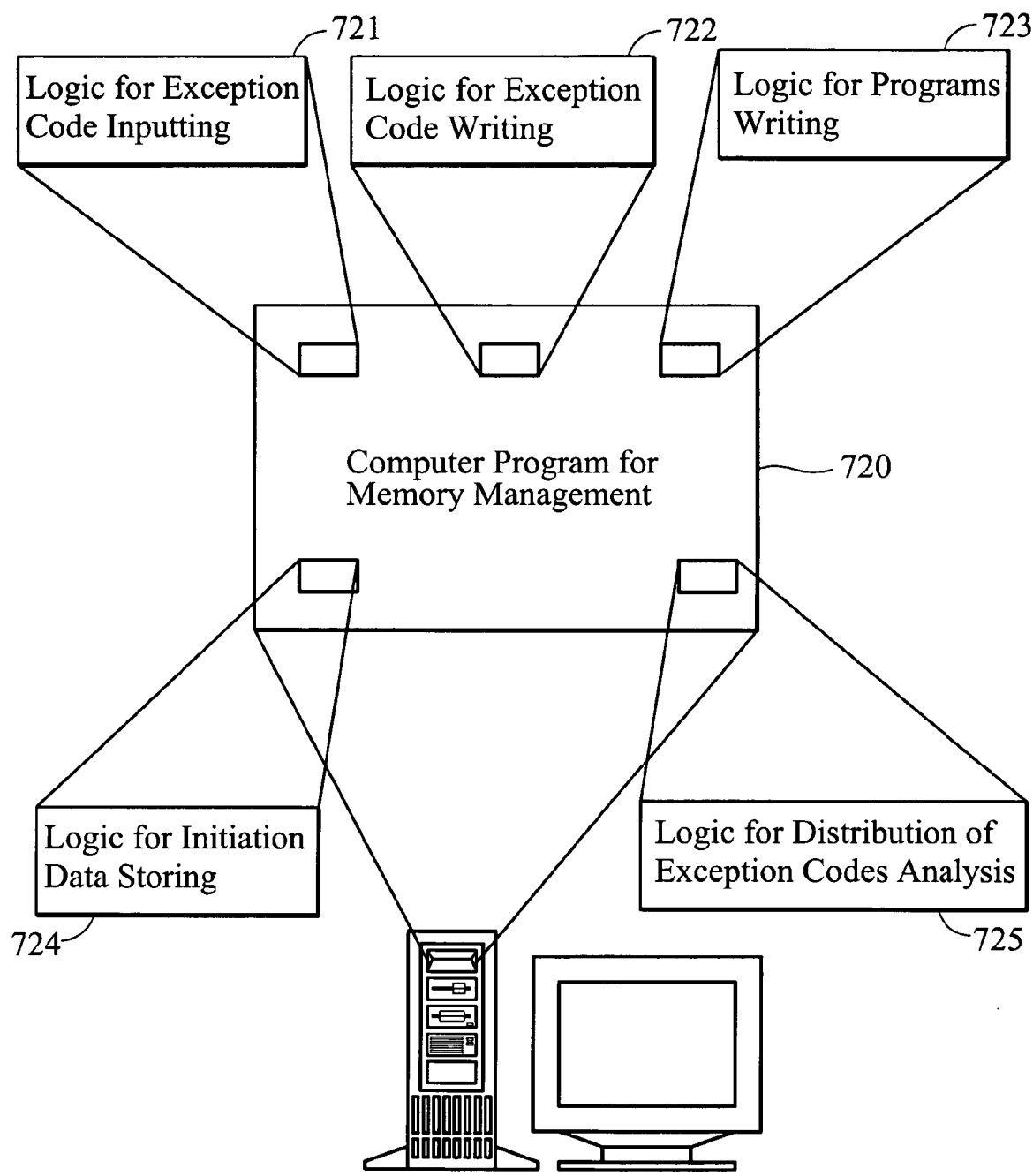
FIG. 7 is a diagram of a storage medium for storing a computer program providing the method of memory management according to the invention.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over a transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The storage medium is shown in FIG. 7.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system of memory management, comprising:
    a first storage device storing an exception code, wherein the exception code is a number excluding operation codes corresponding with an instruction set;
    a memory comprising a program memory and a data memory; and
    a processing unit coupling to the first storage device, configured to input the exception code from the first storage device, write the exception code to the memory entirely in an electronic device, and configured to replace the exception code with at least one program in the program memory and reserves free space between each two programs, the length of free space exceeds the length of the exception code, thereby enabling the electronic device to stop program execution when a CPU in the electronic device fetches the exception code from the memory.

2. The system as claimed in claim 1 wherein the electronic device is a hand-held communication device.

3. The system as claimed in claim 1 further comprising a second storage device storing an initiated data image comprising the exception code in the memory.

4. The system as claimed in claim 3 wherein the processing unit further stores the initiated data image comprising the exception code in the memory to the second storage device.

5. The system as claimed in claim 4 further comprising an analysis unit detecting distribution variation of the exception code in an operating memory by comparison with the initiated data image.

6. A method of memory management, comprising
reading a exception code, the exception code is a number excluding operation codes corresponding to an instruction set;
writing the exception code to a memory entirely in an electronic device, wherein the memory comprises a program memory and a data memory; and
replacing the exception code with at least one program in the program memory and reserving free space between each two programs, the length of the free space exceeds the length of the exception code, thereby enabling the electronic device to stop program execution when a CPU in the electronic device fetches the exception code from the memory.

7. The method as claimed in claim 6 further comprising a step of storing an initiated data image comprising the exception code in the memory to a second storage device.

8. The method as claimed in claim 7 further comprising a step of detecting distribution variation of the exception code in an operating memory by comparison with the initiated data image.

9. The method as claimed in claim 6 wherein the electronic device is a hand-held communication device.

10. A machine-readable storage medium storing a computer program which when executed performs a method of memory management, the method comprising the steps of:
reading an exception code, the exception code is a number excluding operation codes corresponding to an instruction set;
writing the exception code to a memory entirely in an electronic device, wherein the memory comprises a program memory and a data memory;
replacing the exception code with at least one program in at least one preserved region of the program memory; and reserving free space between each two programs, the length of the free space exceeds the length of the exception code, thereby enabling the electronic device to stop program execution when a CPU in the electronic device fetches the exception code from the memory.

11. The machine-readable storage medium as claimed in claim 10, wherein the method further comprises a step of storing an initiated data image comprising the exception code in the memory to a second storage device.

12. The machine-readable storage medium as claimed in claim 11, wherein the method further comprises a step of detecting distribution variation of the exception code in an operating memory by comparison with the initiated data image.

13. The machine-readable storage medium as claimed in claim 12 wherein the electronic device is a hand-held communication device.

* * * * *